United States Patent

[11] 3,599,114

[72] Inventors Elias Snitzer
 Wellesley, Mass.
 Richard F. Woodcock, Woodstock, Conn.
[21] Appl. No. 725,378
[22] Filed Apr. 30, 1968
[45] Patented Aug. 10, 1971
[73] Assignee American Optical Corporation
 Southbridge, Mass.

[54] LASER CONSTRUCTIONS
 4 Claims, 4 Drawing Figs.
[52] U.S. Cl. .................................................. 331/94.5
[51] Int. Cl. ................................................... H01s 3/02
[50] Field of Search ..................................... 331/94.5

[56] References Cited
UNITED STATES PATENTS
3,449,147 6/1969 Campbell et al............. 331/94.5 X
3,445,785 5/1969 Koester et al................ 331/94.5
OTHER REFERENCES
" Glass Lasers" Applied Optics, Vols. No. 10, PP 1487-1497

Primary Examiner—Ronald L. Wibert
Assistant Examiner—Conrad Clark
Attorneys—J. Albert Hultquist and Noble S. Williams ABSTRACT: Laser construction employing an elongated core of preselected laser glass including erbium as an active ion therein and a cladding of selectively absorbing material including praseodymium in surrounding relation to said core for providing coherent laser emission substantially at 1.5 microns wavelength and at high operating efficiency.

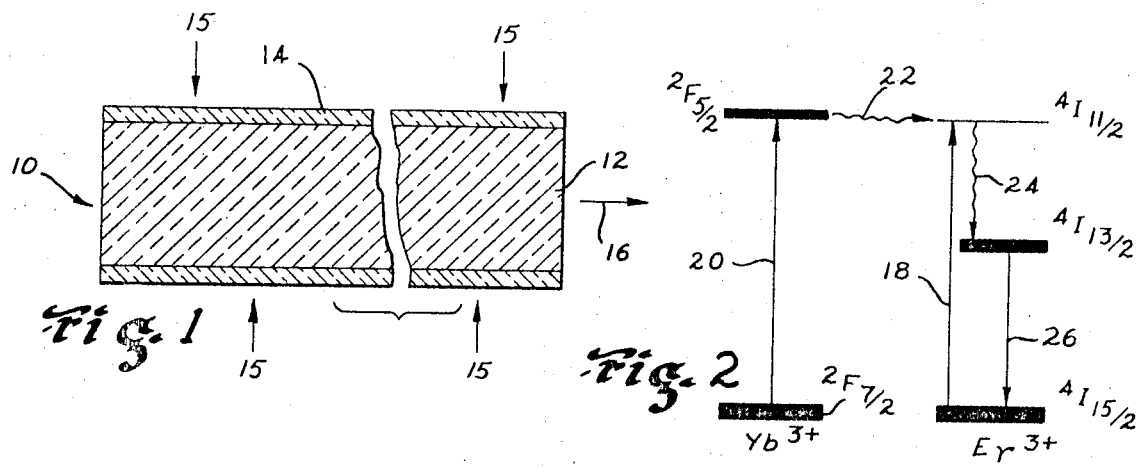
Fig. 1
Fig. 2
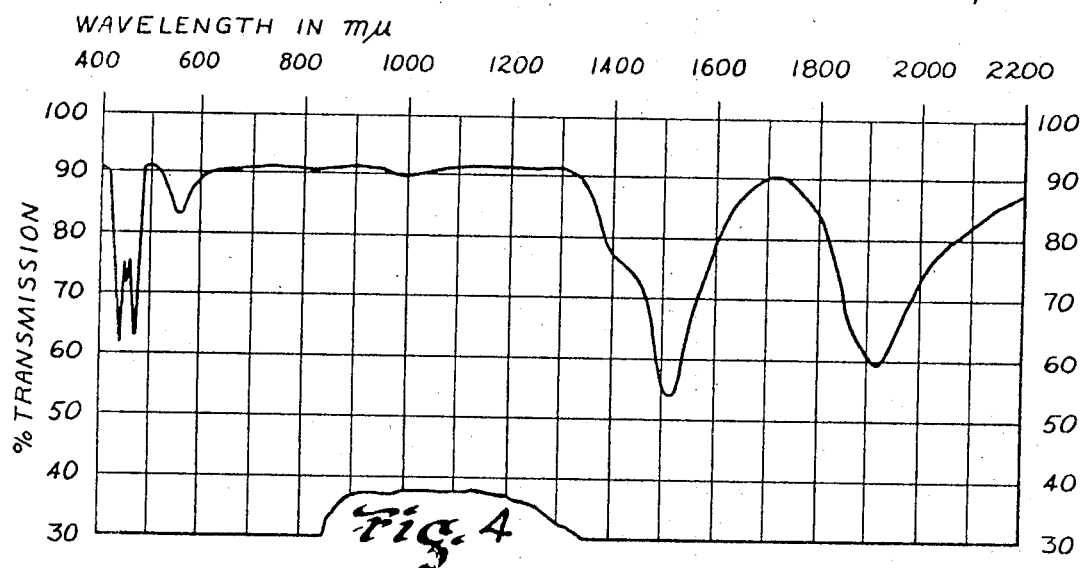
Fig. 4
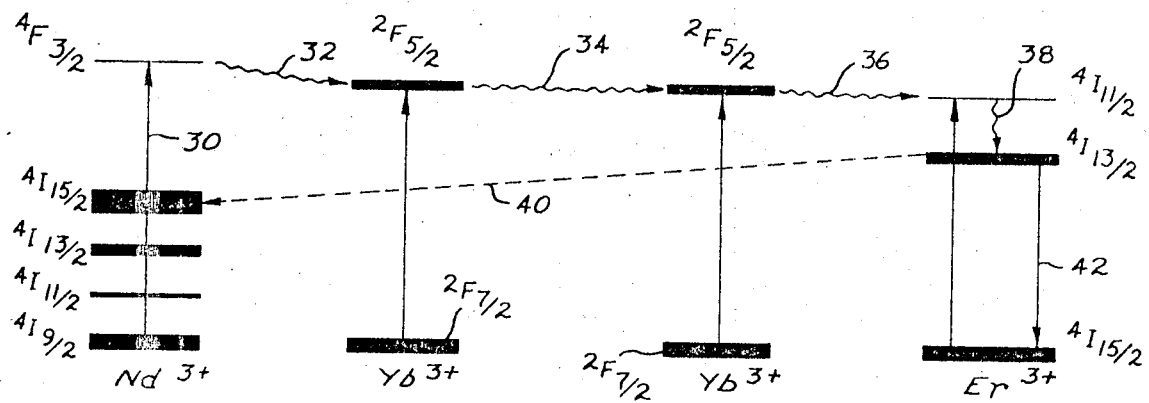
Fig. 3
INVENTORS
ELIAS SNITZER
RICHARD F. WOODCOCK
BY
Noble S. Williams
ATTORNEY

LASER CONSTRUCTIONS

This invention relates to laser constructions and the like, and more particularly to a laser construction employing an elongated core formed of a preselected laser glass containing trivalent erbium as an active laser ion thereof, so as to emit coherent optical energy substantially at the 1.5 micron wavelength region of the electromagnetic spectrum and a cladding of selectively absorbing material disposed in surrounding contacting relation to sidewall portions of said core and containing trivalent praseodymium as an ingredient thereof, said cladding being of good transparency for optical energy at the pumping wavelength bands for said laser glass and, at the same time, having good absorption characteristics for optical energy at the emission wavelength of said laser glass.

It is already known, as disclosed in copending application Ser. No. 420,270, filed Dec. 2, 1964, that trivalent erbium-doped glasses may be lased when suitably pumped by light source means such as a flash tube or the like. It is further disclosed in said earlier-filed application that such an erbium-doped laser glass may be provided with trivalent ytterbium in suitable amounts, or even with trivalent ytterbium and trivalent neodymium together in suitable amounts, so as to act as sensitizing or pump ions for said erbium laser glass, and thereby more readily enable the erbium laser glass to absorb pump energy and reach laser threshold than is possible when trivalent erbium only is employed in the laser glass as the active ingredient thereof.

It has now been found that when trivalent erbium is contained within a host glass the type mentioned above for forming a laser construction which will emit substantially at 1.5 microns wavelength, the operating efficiency of this laser construction can be materially improved by using therewith a selectively absorbing cladding material containing trivalent praseodymium as an ingredient therein. This praseodymium-doped cladding material is such that it will efficiently transmit most of the wavelengths of optical energy in the visible portion of the electromagnetic spectrum and in the near infrared up to 1.2 microns for pumping said laser material therethrough and, on the other hand, is so selectively absorbing that this cladding material affords good absorption for the spontaneously emitted laser energy at 1.5 microns wavelength which may travel from within the laser core material into the surrounding cladding material, thereby helping to prevent a depletion in the population inversion of the pumped laser material at a higher or pumped energy level.

It is, accordingly, an object of the invention to provide a laser construction comprising an elongated core of laser glass containing trivalent erbium as an active ion therein so as to emit substantially at 1.5 microns wavelength and a selectively absorbing cladding material surrounding said core in contacting relation with the sidewall portions thereof and containing trivalent praseodymium as an ingredient thereof.

It is a further object of the invention to provide for such a laser construction comprising an elongated core of trivalent erbium-doped laser glass, trivalent ytterbium as a sensitizing ingredient therein, said trivalent praseodymium of said surrounding cladding material having such characteristics as to allow efficient pumping of said erbium and ytterbium containing laser glass and, at the same time, providing good absorption for optical energy substantially at the 1.5 micron emission wavelength of said laser glass.

It is an additional object of the present invention to provide in such a laser construction employing trivalent erbium and trivalent ytterbium as laser and pump ions thereof, trivalent neodymium as a pump ion therefor, said selectively absorbing cladding material containing trivalent praseodymium also providing transparency for optical energy at the pump wavelength bands for said neodymium ion.

Other objects and advantages of the invention will become apparent from the detailed description which follows when taken in conjunction with the accompanying drawing wherein:

FIG. 1 is a sectional view of a longitudinal laser construction embodying a core of erbium-doped laser glass and a surrounding cladding of selective absorbing material of controlled characteristics so as to function efficiently therewith;

FIG. 2 is a representation of an energy level diagram for a three-level laser system for erbium and for ytterbium, for use in explaining the principles of operation of the present invention;

FIG. 3 is a representation of an energy level diagram for a laser system employing trivalent erbium and showing trivalent ytterbium as well as trivalent neodymium as pump ions therefor; and FIG. 4 is a graph showing a percent transmission curve for trivalent praseodymium containing cladding material plotted against wavelengths in the visible and near infrared regions of the spectrum.

Referring to the drawing in detail, it will be seen that a laser structure is diagrammatically shown at 10 in FIG. 1 and is formed by an elongated core 12 of laser glass having a cladding 14 of selectively absorbing material disposed in surrounding contacting relation with the sidewall portions of said core throughout the length thereof. In a preferred construction, this core will be formed of laser glass having trivalent erbium as the active laser ion thereof. Additionally, the cladding will be formed by a selectively absorbing material having trivalent praseodymium as an ingredient thereof.

In such a construction as shown in FIG. 1, it is often desirable to have only very nearly axially directed laser energy propagated and emitted by the structure and, when such is the case, the refractive index of the core 12 will be predetermined and the refractive index of the cladding material will be carefully controlled relative thereto so that same will have very nearly the same refractive index at the laser emission wavelength of the system. In fact, at times the cladding material may be no more than a one or two thousandths in value less than that of the core material.

When such a laser construction is provided and the structure is pumped by means (not shown) surrounding the structure, pump energy 15 will pass through the cladding material and into said core, and spontaneously emitted laser energy generated within the core will tend to travel in all directions. Thus, some of this light will travel in directions other than substantially longitudinally of the core and will be incident at the core-cladding interface. If the refractive index difference is small, much of this off-axis light will pass therethrough and will then be absorbed by the cladding materials. In this way, such energy will not be allowed to reflect at the core-cladding interface and thus will not be allowed to cause a depletion in the population inversion in the laser material, such as to impair the energy travelling more nearly longitudinally within the core. Such a laser structure, as shown in FIG. 1, may be provided, in known fashion, with opposed parallel reflective surfaces at the opposite end of the laser core so that same may function as a resonant cavity structure for laser light generation. Or as is also well known, such a laser structure, as shown in FIG. 1, may be formed so as to have an appreciably greater length than the transverse dimension thereof, so as to be employed as a travelling wave type of laser amplifier wherein laser energy buildup occurs along the length of the structure during pumping of the structure and produces amplification of light travelling longitudinally therethrough; and without having internal energy-oscillation occurring therein.

In a laser system made in accordance with the teachings of the present invention, it is possible to employ a trivalent erbium-doped laser glass as a core surrounded by a selectively absorbing cladding of material having trivalent praseodymium as an ingredient thereof and obtain improved laser operation substantially at 1.5 microns emission wavelength. It is also possible to employ in conjunction with such an erbium-doped laser glass ytterbium ions, or even ytterbium and neodymium ions together, as pump ions for the erbium laser glass and thereby obtain laser emission substantially at 1.5 microns, as well as an increased laser operating efficiency as compared with most erbium-doped laser material alone. Briefly, a pump ion in a laser host glass, such as erbium laser glass, is used to absorb pump energy from a flash tube, or the like, as the laser material is being raised to a fluorescent energy state. Instead of a subsequent transition downwardly, the pump ion transfers its energy to a laser ion also contained within the host material, due to the fact that an approximate overlap of the fluorescence energy states of the pump ion and the upper energy level of the laser ion exists. In this way, the laser ion is more easily able to obtain and retain a sufficient amount of energy for inversion before laser action commences.

One embodiment of the invention may employ erbium laser glass without having a pump ion also present therein. However, an improved embodiment of the invention provides in the laser glass composition containing trivalent erbium as the laser ion thereof, trivalent ytterbium as a pump ion. Of course, the praseodymium cladding material will be used with both laser compositions. Both of these forms of erbium lasers operate at room temperatures, and emission occurs substantially at 1.5 microns.

Around the elongated core of laser glass and in intimate optical contact with the sidewall portions thereof is disposed the selectively absorbing cladding material containing trivalent praseodymium as an important ingredient thereof. This praseodymium containing cladding material may be, in fact, a solid such as a clear glass or a clear plastic, or a clear liquid, except for coloring due to the praseodymium ions contained therein. A suitable solid could be a glass much like that forming the host material for the laser core (and thus would provide good compatibility, an epoxy resin or a chelate containing trivalent praseodymium, or could be a liquid such as water having praseodymium chloride dissolved therein.

The laser structure, employing only trivalent erbium as the laser ion therein, operates, as shown in FIG. 2, with the trivalent erbium being pumped by a flash tube means or the like from an initial ground level to a higher energy level $4_{I_{11/2}}$ as indicated by arrow 18. Or, as suggested by arrow 20, pumping to a higher level $2_{F_{5/2}}$ may occur in the trivalent ytterbium followed by an energy transfer then taking place from the upper $2_{F_{5/2}}$ energy level of the trivalent ytterbium to the trivalent erbium upper energy level $4_{I_{11/2}}$ this energy transfer being designated by horizontally disposed wavy arrow 22. Nonradiative transition may then occur from the $4_{I_{11/2}}$ energy level to the $4_{I_{13/2}}$ energy level of the trivalent erbium, as indicated by wavy arrow 24. Subsequent transition occurs between this latter energy level and the $4_{I_{15/2}}$ energy level, as indicated by the arrow 26, producing the laser emission desired (as indicated by arrow 16 in FIG. 1), this last-mentioned energy level being only slightly above ground level.

Recommended concentrations for such a laser glass are 15 weight percent for ytterbium oxide ($Yb_2O_3$) and one-fourth percent erbium oxide ($Er_2O_3$). The glass host or base material may comprise 70.64 weight percent of silicon oxide ($SiO_2$), 7.58 weight percent sodium oxide ($Na_2O$), 11.47 weight percent potassium oxide ($K_2O$), 5.05 weight percent barium oxide (BaO), 1.05 weight percent antimony ($Sb_2O_3$), 1.58 weight percent aluminum oxide ($Al_2O_3$), 1.58 weight percent zinc oxide (ZnO), and 1.05 weight percent lithium oxide ($Li_2O$). With a glass composition of this type, the pump ion concentration may be between approximately 0.1 and 60 weight percent of ytterbium oxide ($Yb_2O_3$) and the laser ion concentration may be in the neighborhood of approximately 0.001 percent weight to 20 percent weight of erbium oxide ($Er_2O_3$). When the neodymium ion is also used in the laser glass composition, neodymium oxide ($Nd_2O_3$) in amounts approximately matching the erbium concentration will be used. However, when using erbium and neodymium ions in the laser glass, percentage values nearer the lower end of this range for both $Er^{3+}$ and $Nd^{3+}$ will be preferred.

Additionally, trivalent neodymium ions can be used to sensitize and improve the fluorescence of the erbium laser glass in combination with the ytterbium ions. As an example, it is necessary to use one or two ytterbium ions as intermediate ions for the neodymium pumping ions, and erbium is then used as the laser ion, as suggested in FIG. 3. The laser system of this Figure operates with the neodymium ions being pumped from ground level $4_{I_{9/2}}$ to the $4_{F_{3/2}}$ energy level as shown by arrow 30. An energy transfer then takes place from the $4_{F_{3/2}}$ level of neodymium to the $2_{F_{5/2}}$ level of ytterbium, as represented by the wavy horizontal arrow 32. Cross-relaxation may then take place to the next ytterbium ion, as represented by wavy horizontal arrow 34 and the energy is then transferred, as shown by wavy horizontal arrow 36, to the $4_{I_{11/2}}$ energy level of erbium.

From this $4_{I_{11/2}}$ energy level, there is then a nonradiative transition, as suggested by wavy arrow 38 to the $4_{I_{13/2}}$ energy level of erbium. At this point, if the excited neodymium pump ions are not in a region separated from the erbium ions by one or two ytterbium ions, the laser will quench, by energy transfer to the $4_{I_{15/2}}$ energy level of the neodymium ion, as indicated along the dotted arrow 40.

In order to pump the laser structure according to the embodiment of FIG. 2, it is desirable to have as large a concentration of pumping ions as possible and, on the other hand, the laser ions should be kept fairly low in concentration since at least half of these laser ions must be excited in order for laser emission action to occur, and there is considerable difficulty in inverting a large number of such laser ions. The approximate range of concentrations of pump ions and laser ions as mentioned above for trivalent ytterbium and trivalent erbium are satisfactory.

A feature of the operation of the laser structure, according to the present invention as applied to the erbium-ytterbium-doped laser core and the praseodymium-doped cladding material, is the efficient pumping of this laser core material through the praseodymium-doped cladding material and the efficient transfer of pump energy between the trivalent ytterbium and the trivalent erbium ions, same being facilitated by the approximate overlap of the $2_{F_{5/2}}$ fluorescent state of the ytterbium ion and the $4_{I_{11/2}}$ state of the erbium ion. Furthermore, by using a large concentration of trivalent ytterbium, cross-relaxation takes place between the various trivalent ytterbium ions, as suggested at 34 in FIG. 3. The result is that a ytterbium ion excited in a region far from any trivalent erbium ion can transfer its energy to the next trivalent ytterbium ion and this continues until the energy migrates to the vicinity of the erbium ion to which it then gives its energy. Measurements performed on the ratio of fluorescence from trivalent ytterbium ion and trivalent erbium ion indicate that for concentrations for $Yb_2O_3$ and $Er_2O_3$ 15 weight percent and one-fourth weight percent, respectively, more than 90 percent of the energy is transferred from the trivalent ytterbium ion to the trivalent erbium ion.

The emission wavelength for trivalent erbium laser glass is in the neighborhood of 1.5 microns in the infrared while, on the other hand, the principal pumping wavelength bands therefor are mainly in portions of the visible spectrum. Additionally, the principal pumping wavelengths bands for trivalent ytterbium are in a region of the spectrum between substantially 0.88 microns and 1.02 microns. Furthermore, the main pumping wavelength bands for trivalent neodymium are in the visible between 0.48 microns and 0.90 microns. Accordingly, it will be appreciated that a cladding material of desirable characteristics for operation with the ingredients mentioned above for the laser core material should be strongly absorbing in the 1.5 micron region of the spectrum while same should have good light transmitting properties throughout the greater part of the visible region of the spectrum and into the near infrared at least as far as 1.02 microns or a little more, in order that efficient use may be made of the available pumping optical energy. Also, at the same time, high absorption of spontaneously emitted off-axis laser energy at 1.5 microns should be provided by the cladding material. As shown in FIG. 4 wherein an absorption curve for the praseodymium-containing cladding glass is shown, a relatively good absorption is provided at the 1.5 micron region and, at the same time, a good transmission is provided thereby throughout most of the visible region. This cladding glass was approximately 1 mm. thick and was of the following composition: ZnO 12.39 weight percent, Al₂O₃ 7.13 weight percent, La₂O₃ 8.50 weight percent, P₂O₅ 67.98 weight percent, and Pr₂O₃ 4.0 weight percent.

It should be here mentioned that the combination of ytterbium and erbium ions as well as neodymium ions, when desired, can be used in glass bases other than that mentioned above, with no difficulty being experienced provided that the glasses which are used are of high transparency at the pump wavelength bands of the laser material as well as at the pump wavelength bands for the pump ions. For instance, such inorganic glasses as silicates, phosphates, borates, arsenic trifulphides, selenides, tellurides, chalcongenics, fluorides, oxifluorides, aluminosilicates and germanate glasses may be used.

Having described our invention, we claim:

1. A laser construction for emitting coherent optical energy substantially at 1.5 microns wavelength and at relatively high operating efficiency, said construction comprising an elongated core of solid laser material and a selectively absorbing cladding disposed in surrounding contacting relation to the sidewall portion of said core, said laser material being a laser glass including trivalent erbium as an active laser ion therein, said cladding being formed of a material having trivalent praseodymium as an ingredient thereof, said cladding material having good transparency for optical energy throughout the greater part of the visible spectrum and the near infrared spectrum up to substantially 1.2 microns wavelength, so as to allow optical energy at the pumping wavelength bands for said laser material to pass readily therethrough, said cladding material having an index of refraction which is substantially equal to the index of refraction of said laser glass to allow off-axis emissions by said trivalent erbium ions to pass through said sidewall portion of said core into said cladding material, said cladding material also having good absorption for optical energy substantially at the 1.5 micron region of said spectrum, said cladding material being a glass containing between approximately 0.1 and 30 weight percent concentration of praseodymium oxide in the batch composition therefor.

2. A laser construction as defined in claim 1 and wherein trivalent ytterbium is contained as a pump ion in said laser glass.

3. A laser construction as defined in claim 1 and wherein trivalent ytterbium and trivalent neodymium are contained as pump ions in said laser glass.

4. A laser construction as defined in claim 1 wherein said cladding glass is composed essentially of the following batch constituents:

| | |
|---|---|
| ZnO | 12.39 weight percent |
| Al₂O₃ | 7.13 weight percent |
| La₂O₃ | 8.50 weight percent |
| P₂O₅ | 67.98 weight percent |
| Pr₂O₃ | 4.0 weight percent |